United States Patent
Synge (10) Patent No.: US 8,131,698 B2
(45) Date of Patent: Mar. 6, 2012

(54) METHOD FOR COORDINATING UPDATES TO DATABASE AND IN-MEMORY CACHE

(75) Inventor: James M. Synge, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 12/128,422

(22) Filed: May 28, 2008

(65) Prior Publication Data

US 2009/0300286 A1    Dec. 3, 2009

(51) Int. Cl.
*G06F 7/00* (2006.01)
(52) U.S. Cl. ........................................ 707/705
(58) Field of Classification Search .............. 707/609, 707/687
See application file for complete search history.

(56) References Cited

U.S. PATENT DOCUMENTS

| | | | |
|---|---|---|---|
| 2002/0087500 A1* | 7/2002 | Berkowitz et al. | 707/1 |
| 2005/0033923 A1* | 2/2005 | Venkatraman | 711/118 |
| 2005/0066121 A1* | 3/2005 | Keeler | 711/113 |

OTHER PUBLICATIONS

"ObjectGrid Programming Model Guide," retrieved from the World Wide Web on May 28, 2008 at http://www-1.ibm.com/support/docview.wss?uid=swg27006432.
"Oracle Coherence," retrieved from the World Wide Web on May 28, 2008 at http://www.oracle.com/technology/products/coherence/index.html.
"Java Caching System," retrieved from the World Wide Web on May 28, 2008 at http://jakarta.apache.org/jcs/.
"Welcome to ehcache," retrieved from the World Wide Web on May 28, 2008 at http://ehcache.sourceforge.net/.

* cited by examiner

*Primary Examiner* — Truong Vo
(74) *Attorney, Agent, or Firm* — Hamilton, Brook, Smith & Reynolds, P.C.

(57) ABSTRACT

A computer method and system of caching. In a multi-threaded application, different threads execute respective transactions accessing a data store (e.g. database) from a single server. The method and system represent status of datastore transactions using respective certain (e.g. Future) parameters.
Results of the said transactions are cached based on transaction status as represented by the certain parameters and on data store determination of a subject transaction. The caching employs a two stage commit and effectively forms a two level cache. One levels maps from datastore keys to entries in the cache. Each entry stores a respective last known commit value. The second level provides an optional mapping from a respective transaction as represented by the corresponding certain parameter to an updated value.

14 Claims, 4 Drawing Sheets

METHOD FOR COORDINATING UPDATES TO DATABASE AND IN-MEMORY CACHE

BACKGROUND

Multi-threaded applications (clients or servers) often cache the results of computations (e.g. result sets from queries) to avoid repeating the computations. Invalidating or updating of these caches is often the hardest part of managing them (except in the simple case of caching immutable data, where only expiration for memory management purposes is needed).

In the case of a cache of database query results, modifications to the database may require invalidating or updating entries in the cache. Simplistic solutions exist, such as invalidating the cache when the update is performed, but this opens a timing window where another thread can load the old data into the cache before the update is committed (and a similar problem occurs when invalidation is done after the update is committed). These simplistic solutions also have the problem that when an entry is not found in the cache, each interested thread must compute that value, unaware of duplicate effort by other threads, or worse, changes that are about to be made by other threads, which can lead to overwriting of new values with old values.

There are a number of commercial solutions (e.g. Object-Grid by IBM) supporting caching in a cluster, with coordination with database updates (e.g. using a distributed transaction manager). For simpler applications (e.g. not scaling to multiple servers), there is a shortage on available solutions.

BRIEF SUMMARY

The present invention provides a transactional cache that combines a very simple form of local two-phase commit (2PC) with a two-level cache (each transaction sees its own changes on top of a shared cache). The 2PC involves none of the overhead that typically comes with adding an additional resource manager because the cache is not providing locking, but rather depending upon the underlying database to determine which transaction will succeed in the event of contention. As a result, hooking this transactional cache into an application is fairly straightforward.

In some embodiments, the invention involves a computer method and system of caching comprising executing a multi-threaded application, different threads executing respective transactions accessing a data store from a single server; representing status of said transactions (e.g. using a Future parameter); and caching results of said transactions based on transaction status and on data store determination of transaction. The caching is accomplished in a two stage commit and effectively forms a two level cache. One level maps from keys to cache entries. Another level optionally maps from a respective transaction to an updated value.

In one embodiment, for a given transaction a flag is used with the Future parameter of the transaction. the flag demarks or records transition from performing the given transaction to committing the given transaction. This effectively properly stalls other transactions awaiting conclusion of the given transaction.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1A:
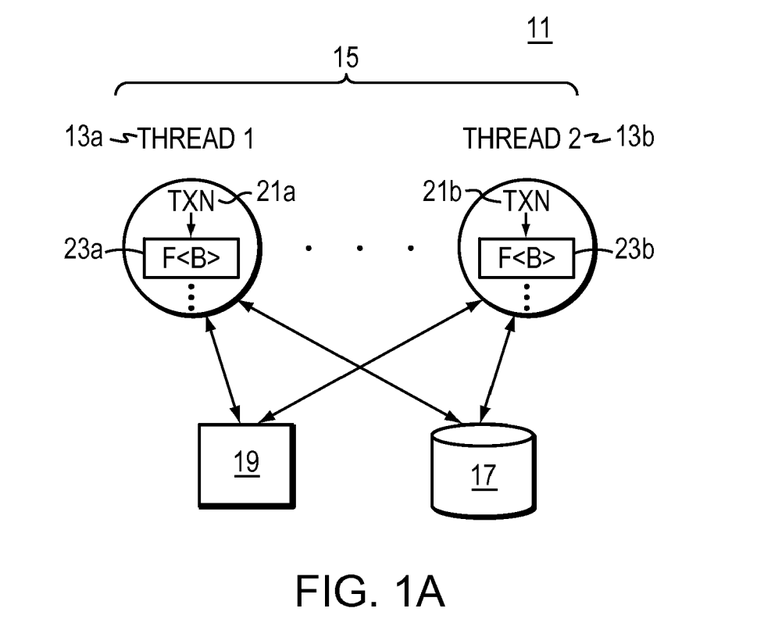
FIGS. 1a and 1b are schematic diagrams of a transactional cache of the present invention in multi-thread applications accessing a datastore from a single (non-distributed) server system.

Illustrated in FIG. 1a are various threads 13a, b . . . of a multi-threaded application 15, a subject database 17 accessed by the application 15 and a transactional cache 19 of the present invention. The database 17 maybe a backing store, other data store, and the like. The application 15 accesses the database 17 from a single server or a non-distributed processing system 11.

In the illustrated example, Thread 1 at 13a executes a database transaction 21a, and Thread 2 at 13b executes a respective database transaction 21b. For each transaction 21a, b . . . (21 generally), the status of the transaction 21 is represented using the notion of a Future 23 (the result of a computation (being) performed by some thread 13), in this case executing a respective database transaction 21. The value of Future 23 is set to indicate whether or not the transaction succeeded (e.g. a Future<Boolean>). Threads 13 can determine whether another thread's transaction 21 has completed by asking if the corresponding Future 23 is done (has a value), and if it is done, can get that value (e.g. true for succeeded/committed, false for failed/rolled back).

Figure 1B:
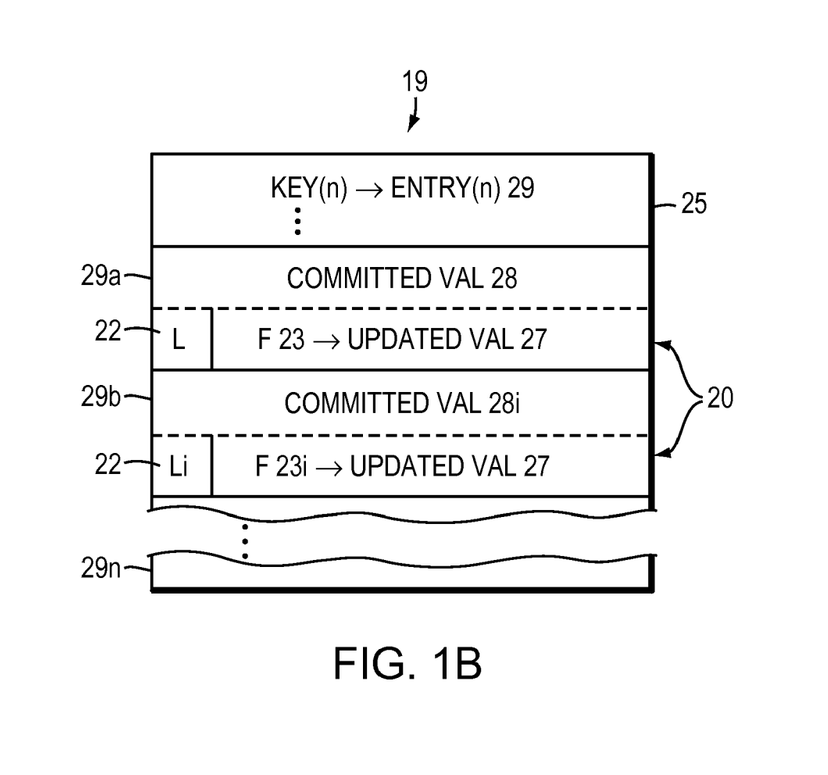

Turning to FIG. 1B, the cache 19 is preferably implemented using a map 25 from keys to entries, where an entry 29 contains the last known committed value 28 (if there is one), and an optional map 20 from a transaction 21 (represented by the respective Future 23 described above) to an updated value 27 (including none or a flag indicating that the value needs to be recomputed, i.e. that the value is unknown to the transaction 21, and thus the entry 29 is invalid). When a transaction 21 fetches a value from the cache 19, the key is used to find an entry 29a, b . . . (29 generally), and then the transaction's Future 23 is used to determine whether the transaction 21 has its own private value 27 (or has invalidated); if there is no private value, then the global value at 28 is used.

To avoid the problem of the cache 19 having old values added to it, several strategies must be employed:

Changes to the top-level map 25 must use atomic Compare-And-Set (CAS) operations, where the mapping from Key to Entry 29 is only changed if the old mapping is known (i.e. has not changed since the last time the thread 13 looked at it).

The Entries 29 themselves must be immutable, which prevents implicit changes to the mapping 25 from Key to Entry; this means that any "change" to an existing Entry 29 must be done by creating a replacement Entry 29n.

Adding missing values is done by adding an appropriate Entry 29 to the map 20 containing a Future 23 representing the result of computing the value at 27, 28, and that computation must be done after the Entry 29 has been added to the map 20, not before. This allows contending threads 13 to invalidate the mapping 20 information between the time when the Entry 29 was added to the map 20, and when the value 27, 28 was computed; without this, other threads 13 could run entire invalidating transactions 21 in the time between when the first thread 13a determined that the value 27, 28 was not in the map 20 and when it added the value 27, 28 it had computed to the map 20.

Figure 3:
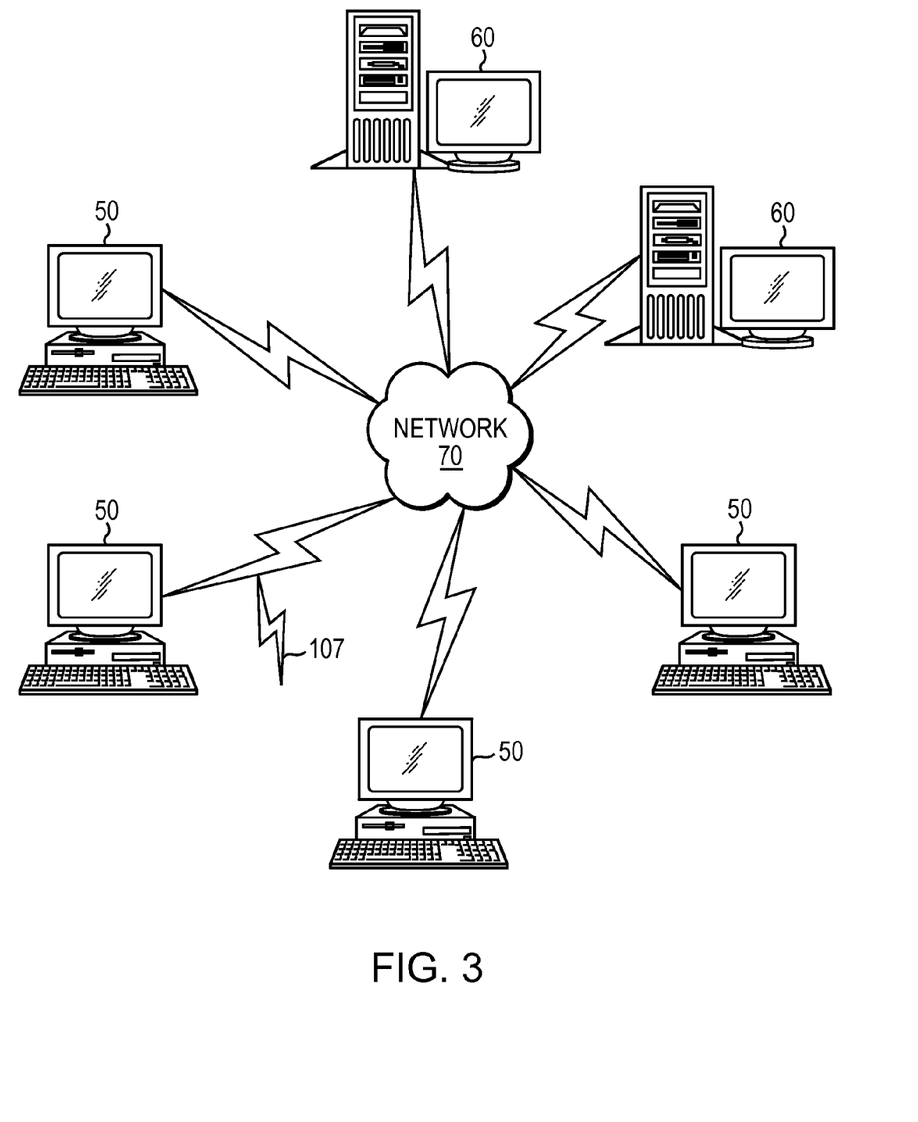
FIG. 3 is a schematic view of a computer network environment in which embodiments of the present invention are implemented.

To avoid the problem of reading old values from the cache, a simple form of two-phase commit has been implemented using a latch (flag) 22 in the Future<Boolean> 23, where the latch records the transition from performing the transaction 21 to committing the transaction 21. In the period between starting the commit and updating the Future 23 with the result of the transaction 21 (e.g. did the commit succeed), any request to know whether the Future 23 has a value will stall awaiting the conclusion of the transaction 21. This avoids the following problem where old values are read from the cache:

Txn 0 writes database row X with state A
Txn 0 inserts the mapping from X to A into the cache
Txn 0 commits
Txn 1 starts
Txn 1 reads X from the cache, gets state A
Txn 1 produces state B of X
Txn 1 updates database row X with state B (locks row X)
  Txn 2 starts
  Txn 2 attempts to get an update lock on row X (waits)
Txn 1 inserts the mapping from X to B into the cache (private to the txn)
Txn 1 commits (unlocks row X)
  Txn 2 gets the lock on database row X
  Txn 2 reads X from the cache, gets state A (should get state B)
Txn 1 sets the value of its Future<Boolean> to indicate that the txn succeeded
  Txn 2 produces state C of X
  Txn 2 updates database row X with state C (fails due to optimistic locking, detects that current state was not B)
  Txn 2 sets the value of its Future<Boolean> to indicate that the txn failed Applicants avoid this problem with the introduction of the latch 22 that indicates that the transaction 21 (Txn 1, in this example) is at the end (has started to commit, or has finished committing). Thus one obtains the following timeline:

Txn 0 writes database row X with state A
Txn 0 inserts the mapping from X to A into the cache
Txn 0 commits
Txn 1 starts
Txn 1 reads X from the cache, gets state A
Txn 1 produces state B of X
Txn 1 updates database row X with state B (locks row X)
  Txn 2 starts
  Txn 2 attempts to get an update lock on row X (waits)
Txn 1 inserts the mapping from X to B into the cache (private to the txn)
Txn 1 sets the latch in its Future<Boolean> to indicate that the transaction is at the end
Txn 1 commits (unlocks row X)
  Txn 2 gets the lock on row X
  Txn 2 reads X from the cache, waits due to the latch
Txn 1 sets the value of its Future<Boolean> to indicate that the txn is done
  Txn 2 unblocked, gets state B from the cache
  Txn 2 produces state C of X
  Txn 2 updates database row X with state C
  Txn 2 sets the latch in its Future<Boolean> to indicate that the transaction is at the end
  Txn 2 commits
  Txn 2 sets the value of its Future<Boolean> to indicate that the txn is done FIG. 3 illustrates a computer network or similar digital processing environment in which the present invention may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 4:
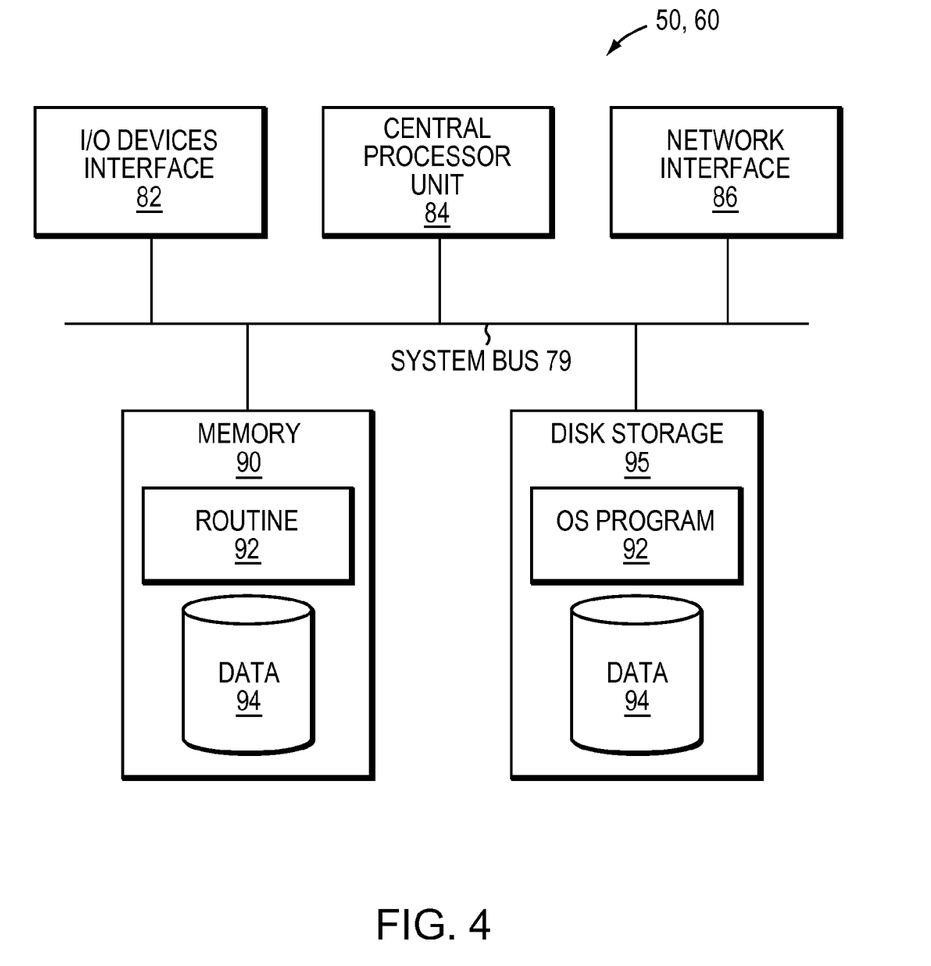
FIG. 4 is a block diagram of a computer node of the network of FIG. 3.

FIG. 4 is a diagram of the internal structure of a computer (e.g., client processor/device 50 or server computers 60) in the computer system of FIG. 3. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 3). Memory 90 provides volatile storage for computer software instructions 92 and data 94 used to implement an embodiment of the present invention (e.g., transactional cache 19 and supporting code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
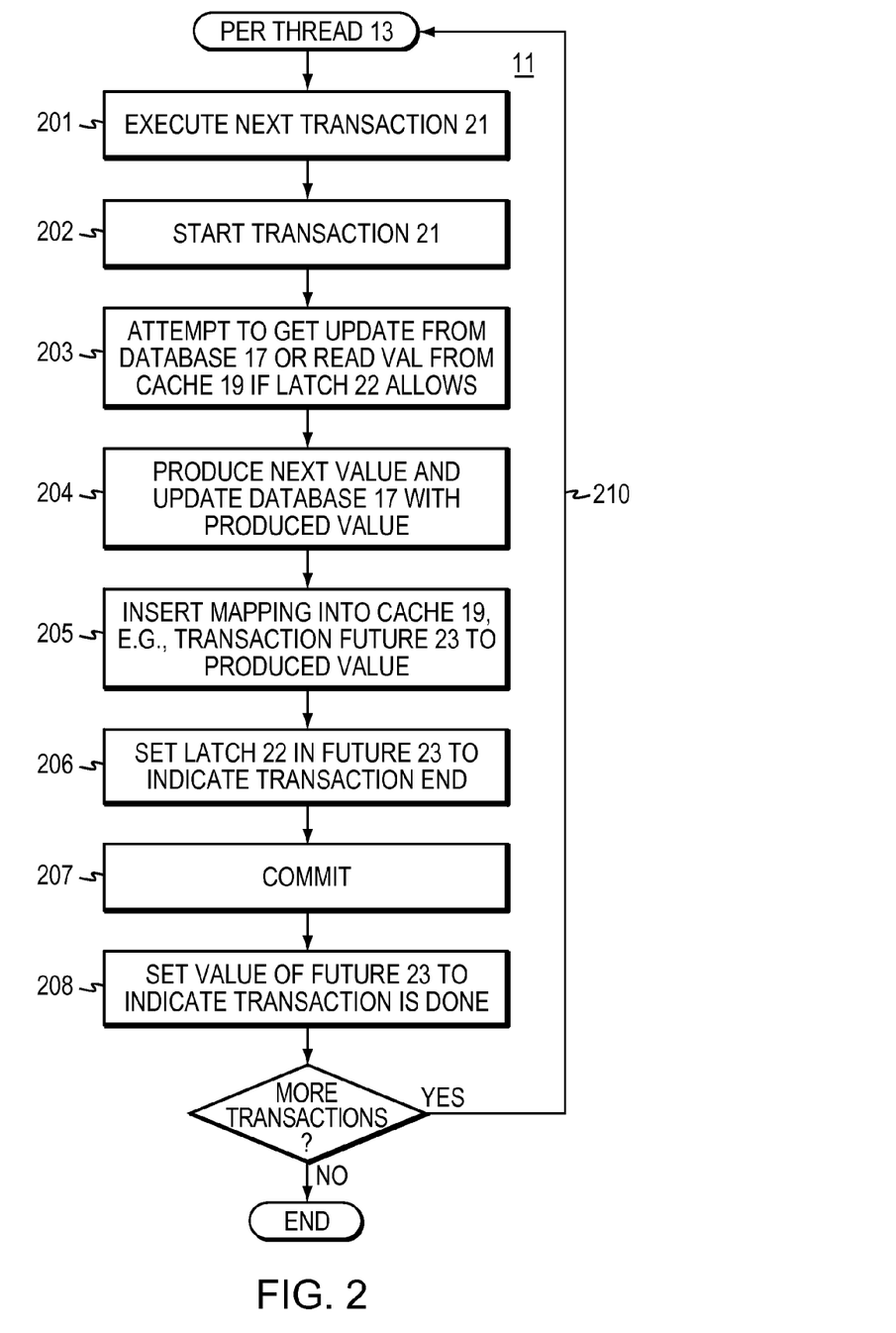
FIG. 2 is a flow diagram of the embodiment of FIGS. 1a-1b.

Referring now to FIG. 2 illustrated is a flow diagram of the FIG. 1a and 1b embodiment of the present invention. In particular, for each thread 13, database transactions 21 are executed following the steps 201-208 as indicated by loop 210 in FIG. 2. For a given thread 13, a current transaction 21 is executed at step 201. Step 202 starts the transaction. At step 203, the transaction attempts to get an update value (read a row) from the working database 17 or reads the value from in memory cache 19 if the corresponding latch 22 allows. If the database row is locked or the latch 22 is set in the cache 19, then transaction 21 waits for respective unlocked or unblocked condition.

Having read the value from cache 19, the transaction in step 204 produces the next value and updates the database 17 with the produced value. This is accomplished according to the above described routine/procedure (time line). Thus in step 205, the transaction inserts into cache 19 the mapping from the transaction Future 23 to the produced value. In step 206, the transaction sets latch 22 (as described above) in Future 23 to indicate that the transaction is at the end.

The transaction goes on to commit in step 207. Finally at step 208 the transaction sets the value of its Future 23 to indicate that the transaction is done. If there are more transactions, then loop 210 reverts to step 201 to continue processing the other transactions 21 of threads 13.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While this invention has been particularly shown and described with references to example embodiments thereof, it will be understood by those skilled in the art that various changes in form and details may be made therein without departing from the scope of the invention encompassed by the appended claims.

For example, latches 22 are described above but flags and other indicators are suitable. Similarly, Future parameter 23 is disclosed but other status indicators/representations are suitable.

What is claimed is:

1. A computer method of caching comprising:
executing a multi-threaded application, different threads executing respective transactions accessing a data store from a single server;
representing respective status of each of said transactions;
for each transaction, recording in a cache transition from performing the transaction to committing the transaction by twice caching results of the transaction, once based on respective represented transaction status and once based on data store determination of transaction, such that caching is accomplished in a two stage commit where the transaction indicates in its respective represented status that the transaction has started to commit, then the transaction goes on to commit and subsequently sets its respective requested status to indicate that the transaction is done, and the cache is formed of two levels that effectively record the transition from performing the transaction to committing the transaction, wherein each transaction sees its own produced value on top of the cache as shared including known commit values, wherein the step of representing respective status of said transactions includes:
for each transaction, using a respective Future parameter having a Boolean value of true for succeeded/committed and false for failed/rolled back; and the step of caching results of the transaction includes:
using a flag with the respective Future parameter, the flag recording transition from performing the transaction to committing the transaction and effectively stalling other transactions awaiting conclusion of the transaction.

2. A method as claimed in claim 1, wherein the data store is a database.

3. A method as claimed in claim 1, wherein the two level cache includes:
in one level, mapping from keys to entries in the cache, each entry storing a respective last known commit value; and
in the second level, an optional mapping from a respective transaction as represented by the corresponding Future parameter to an updated value.

4. A method as claimed in claim 1, wherein the flag is a latch.

5. A method as claimed in claim 1, wherein the two level cache is in-memory relative to the multi-threaded application.

6. A computer caching system comprising:
a data store supporting a multi-threaded application, different threads executing respective transactions accessing the data store from a single server;
transaction status indicators representing respective status of said transactions; and
a cache formed of two level storage, and for each transaction, the cache recording transition from performing the transaction to committing the transaction, by twice storing results of the transaction, once based on transaction status indicators and once based on data store determination of the transaction, such that said cache employs a two phase commit where the transaction indicates in its respective represented status that the transaction has started to commit, then the transaction goes on to commit and subsequently sets its respective requested status to indicate that the transaction is done, and the two level storage effectively records the transition from performing the transaction to committing the transaction, wherein each transaction sees its own produced value on top of the cache as shared including known commit values, wherein the transaction status indicators include:
for each transaction, a respective Future parameter having a Boolean value of true for succeeded/committed and false for failed/rolled back; and wherein the cache stores results of the transaction by:
using a flag with the respective Future parameter, the flag recording transition from performing the transaction to committing the transaction and effectively stalling other transactions awaiting conclusion of the transaction.

7. A caching system as claimed in claim 6, wherein the data store is a database.

8. A caching system as claimed in claim 6, wherein the two level storage includes:
a mapping from keys to entries in the cache, each entry storing a respective last known commit value; and an optional mapping from a respective transaction as represented by the corresponding Future parameter to an updated value.

9. A caching system as claimed in claim 6, wherein the flag is a latch.

10. A caching system as claimed in claim 6, wherein the transaction status indicators represent results of computations being performed by the transactions.

11. A caching system as claimed in claim 6, wherein the cache is in-memory relative to the multi-threaded application.

12. An in-memory computer cache comprising:
given a multi-threaded application, different threads executing respective transactions accessing a data store from a single server, a transaction cache storing results of the transactions and recording transition from performing the transaction to committing the transaction by having:
a two level storage, one level mapping from data store keys to entries in the cache; and
a second level optionally mapping from a respective transaction to an updated value;
wherein each respective transaction is represented by a corresponding value indicative of computations being performed by the transaction and the cache employs a two phase commit where the transaction sets an indication that the transaction has started to commit, then the transaction goes on to commit and then the transaction sets the corresponding value to indicate that the transaction is done, such that each transaction sees its own produced value on top of the cache as shared including known commit values, the corresponding value being a Boolean value of true for succeeded/committed and false for failed/rolled back; and
for a given transaction, a flag operably coupled to the second level, the flag recording transition from performing the given transaction to committing the given transaction and effectively stalling other transactions awaiting conclusion of the given transaction.

13. A computer cache as claimed in claim 9, wherein the data store is a database.

14. A computer program product for caching results of database transactions, the computer program product comprising:
a computer readable storage medium having computer usable program code embodied therewith, the computer usable program code comprising:
computer useable code configured to implement a cache having a two stage commit and two levels such that each database transaction sees its produced updated value on top of an effectively shared store of known commit values, the two levels effectively recording transition from performing the transaction to committing the transaction, the two stage commit including the transaction setting an indication that the transaction has started to commit, then the transaction goes on to commit and then the transaction setting the updated produced values to indicate that the transaction is done;
computer usable code configured to implement the database transactions accessing a database from a single server; and
computer useable code configured to implement each respective transaction being represented by a corresponding value indicative of computations being performed by the transaction, the corresponding value being a Boolean value of true for succeeded/committed and false for failed/rolled back;
wherein the cache stores results of the transaction by using a flag operably coupled to the second level, the flag recording transition from performing the transaction to committing the transaction and effectively stalling other transactions awaiting conclusion of the transaction.

* * * * *

UNITED STATES PATENT AND TRADEMARK OFFICE
CERTIFICATE OF CORRECTION

| | | |
|---|---|---|
| PATENT NO. | : 8,131,698 B2 | Page 1 of 1 |
| APPLICATION NO. | : 12/128422 | |
| DATED | : March 6, 2012 | |
| INVENTOR(S) | : James M. Synge | |

It is certified that error appears in the above-identified patent and that said Letters Patent is hereby corrected as shown below:

In Claim 14, Column 10:
Line 8, after "a" and before "computer", insert --nontransitory--

Signed and Sealed this
Tenth Day of April, 2012

David J. Kappos
*Director of the United States Patent and Trademark Office*